United States Patent [19]

Yanagawa et al.

[11] Patent Number: 4,886,335
[45] Date of Patent: Dec. 12, 1989

[54] OPTICAL FIBER SWITCH SYSTEM

[75] Inventors: Hisaharu Yanagawa; Toshihiro Ochiai; Hidehisa Miyazawa; Shizuka Yamaguchi; Tsuyoshi Fumeno; Hiroshi Raijo; Seiji Ohmizu, all of Ichihara, Japan

[73] Assignee: Furukawa Electric Co., Ltd., Tokyo, Japan

[21] Appl. No.: 290,996

[22] Filed: Dec. 28, 1988

[30] Foreign Application Priority Data

Jan. 7, 1988 [JP] Japan ................................. 63-1535

[51] Int. Cl.$^4$ ........................ G02B 6/36; H01J 5/16; H04B 9/00; G02F 1/00
[52] U.S. Cl. ........................... 350/96.20; 350/96.16; 350/96.21; 350/96.22; 250/227; 370/3; 455/612; 455/617
[58] Field of Search ............. 350/96.15, 96.16, 96.20, 350/96.21, 96.22; 250/227, 230; 356/445, 447, 448; 370/1, 3; 455/600, 605, 610, 612, 617

[56] References Cited

U.S. PATENT DOCUMENTS

| | | | |
|---|---|---|---|
| 4,027,945 | 6/1977 | Iverson | 350/96.22 X |
| 4,193,662 | 3/1980 | Hara | 350/96.15 |
| 4,223,978 | 9/1980 | Kummer et al. | 350/96.20 |
| 4,303,302 | 12/1981 | Ramsey et al. | 350/96.20 |
| 4,322,126 | 3/1982 | Minowa et al. | 350/96.20 |
| 4,401,365 | 8/1983 | Mizokawa et al. | 350/96.20 |
| 4,460,242 | 7/1984 | Birch et al. | 350/96.20 |
| 4,472,052 | 9/1984 | Lofgren | 250/227 X |
| 4,546,249 | 10/1985 | Whitehouse et al. | 250/227 |
| 4,580,292 | 4/1986 | Laor | 350/96.20 |
| 4,653,849 | 3/1987 | Boirat et al. | 350/96.22 |
| 4,653,850 | 3/1987 | Boirat et al. | 350/96.22 |
| 4,699,457 | 10/1987 | Goodman | 350/96.20 |
| 4,761,777 | 8/1988 | Edwards et al. | 370/3 |

FOREIGN PATENT DOCUMENTS 2109189  5/1983  United Kingdom .............. 370/3 X

OTHER PUBLICATIONS

"Tohoku-Section Joint Convention Record of Institute of Electrical and Information Engineers, Japan"; p. 2, lines 18–22.

Primary Examiner—William L. Sikes
Assistant Examiner—Brian M. Healy
Attorney, Agent, or Firm—Frishauf, Holtz, Goodman & Woodward

[57] ABSTRACT

An optical switch system used in a monitoring system for monitoring a large-scale optical transmission including a multiplicity of optical fibers, or like systems for switching optical transmission paths. The optical switch system comprises first and second optical switches. The first optical switch serves to optically connect one end face of a single first optical fiber selectively to one end face of any one of n second optical fibers. The second optical switch serves to optically connect end faces of n third optical fibers collectively and substantially synchronously to end faces of fourth optical fibers of a desired bundle selected from a plurality of optical fiber bundles each composed of substantially n optical fibers, the third optical fibers being optically connected at other end faces to other end faces of the second optical fibers.

19 Claims, 17 Drawing Sheets

OPTICAL FIBER SWITCH SYSTEM

BACKGROUND OF THE INVENTION

The present invention relates to an optical switch system used, e.g., in a monitoring system for optical transmission lines including a multiplicity of optical fibers, or like systems for switching optical transmission paths.

As a method for monitoring optical transmission lines including numerous optical fibers without influencing ongoing optical communications, one illustrated in FIG. 1, for example, is known. This method is used for monitoring the optical communication lines of a system in which an electro-optic converter 2 and an opto-electric converter 3 are provided at opposite ends of optical communication lines 1 and optical signals with wavelength λ1 are transmitted between the converters 2 and 3. The optical communication lines 1 include an optical multiplexer/demultiplexer 4 on the side of the electro-optic converter 2 and an optical filter 5 on the side of the opto-electric converter 3. To the optical multiplexer/demultiplexer 4 are connected optical monitoring lines 7 corresponding in number to the optical communication lines 1 and optically connected thereto. The optical monitoring lines 7 are each provided with an OTDR (optical time domain reflectometer) 6 at its end. A monitoring light beam with wavelength λ2 is made to be incident sequentially to the optical monitoring lines 7 through the OTDRs 6 and is introduced into the corresponding optical communication lines 1 while being multiplexed with the optical signal with wavelength λ2 by the optical multiplexer/demultiplexer 4. Only the monitoring light beam with wavelength λ2 is reflected by the optical filter 5 to outside so that it is not incident to the opto-electric converter 3, while faint reflection light reflected at any points along the lengths of the fibers is transmitted back to the OTDRs 6, thereby monitoring the individual optical fibers of the optical communication lines 1.

In this method, however, the OTDR 6 which is expensive must be attached to each of the optical fibers of the optical monitoring lines 7, which is disadvantageous from the standpoint of cost and practicality.

There has been proposed another method for monitoring the individual optical fibers of optical communication lines, for example, in "1988 TohokuSection Joint Convention Record of Institutes of Electrical and Information Engineers, Japan," (Aug. 25 and 26, 1988 at Tohoku University, Department of Technology) page 140. In this method, a 1×n optical switch 8 is connected to the optical monitoring lines 7 and is also connected to a single OTDR 6 by means of a single optical fiber 9. The optical switch 8 serves to connect the single optical fiber 9 sequentially to the terminals of the optical monitoring lines 7.

This method, however, is disadvantageous in that the optical switch 8 requires adapters as many as the optical monitoring lines 7 to be connected thereto. The optical switch 8 therefore must necessarily be large in size if it is to be applied to large-scale optical communication lines 1. Moreover, switching or connection of the single optical fiber 9 sequentially to the terminals of the optical monitoring lines 7 requires a lot of time and labor in the case where the number of optical fibers constituting the optical monitoring lines 7 is large, for example, more than 10,000, thus making the monitoring extremely complex.

OBJECTS AND SUMMARY OF THE INVENTION

It is an object of the present invention to provide an optical switch system which is used in a monitoring system for large-scale optical transmission lines, or like systems and which is capable of switching optical transmission lines in a short time and with ease yet simple in structure and inexpensive.

The present invention provides an optical switch system comprising: first optical switch means for optically connecting one end face of a single first optical fiber selectively to one end face of any one of n second optical fibers; and second optical switch means for optically connecting end faces of n third optical fibers collectively and substantially synchronously to end faces of fourth optical fibers of a desired bundle selected from a plurality of optical fiber bundles each composed of substantially n fourth optical fibers, the third optical fibers being optically connected at other end faces to other end faces of the second optical fibers.

Preferably, the first optical switch means comprises n adapter means individually connected to the ends of the second optical fibers, and ferrule means connected to the end of the first optical fiber and having an end face at which the end face of the first optical fiber is exposed. The ferrule means is connectible to any one of the adapter means and, when connected to one of the adapter means, optically connects the end face of the first optical fiber to the end face of the corresponding second optical fiber to which the ferrule means is being connected by means of the adapter means.

Still preferably, the first optical switch means further comprises first selector means for producing a selection signal to connect the ferrule means to a desired one of the n adapter means, first conveyor means for moving the ferrule means to any one of the adapter means, first coupler/decoupler means for connecting and disconnecting the ferrule means to and from the adapter means, and first controller means for causing the first conveyor means to move the ferrule means to a selected one of the adapter means and causing the first coupler/decoupler means to connect and then disconnect the ferrule means to and from the selected one of the adapter means, in accordance with the selection signal from the first selector means.

Preferably, the second switch means comprises first multiple-fiber connector means connected to the end of each of the n third optical fibers and having an end face at which the end faces of the third optical fibers are exposed, and second multiple-fiber connector means equal in number to the optical fiber bundles, connected individually to the ends of the optical fiber bundles each composed of the fourth optical fibers, and having an end face at which the end face of the corresponding optical fiber bundle is exposed. The first multiple-fiber connector means is connected to one of the second multiple-fiber connector means at end faces thereof, thereby optically connecting the third optical fibers collectively and substantially synchronously to the fourth optical fibers through the second multiple-fiber connector means which is being connected to the first multiple-fiber connector means.

Still preferably, the second optical switch means includes holder means on which the second multiple-fiber connector means are secured and arranged in respective predetermined positions, second conveyor means holding the first multiple-fiber connector means, for moving the same among the second multiple-fiber connector means on the holder means, second coupler/decoupler means for connecting the end face of the first multiple-fiber connector means to the end face of any one of the second multiple-fiber connector means at a predetermined position, second selector means for producing a selection signal selecting one of the second multiple-fiber connector means, and second controller means for causing the second conveyor means to move the first multiple-fiber connector means to a selected one of the second multiple-fiber connector means and causing the second coupler/decoupler means to connect and then disconnect the end face of the first multiple-fiber connector means to and from the end face of the selected second multiple-fiber connector means, in accordance with the selection signal from the second selector means.

The above and other objects, features and advantages of the present invention will become apparent from the ensuing detailed description taken in connection with the accompanying drawings.

DETAILED DESCRIPTION

Figure 1:
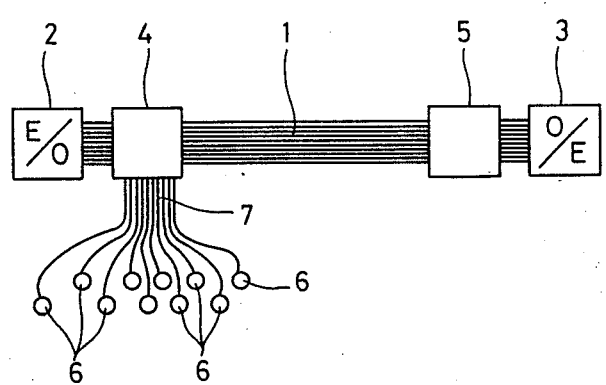
FIG. 1 is a block diagram illustrating an arrangement of a conventional optical transmission line monitoring system.
Figure 2:
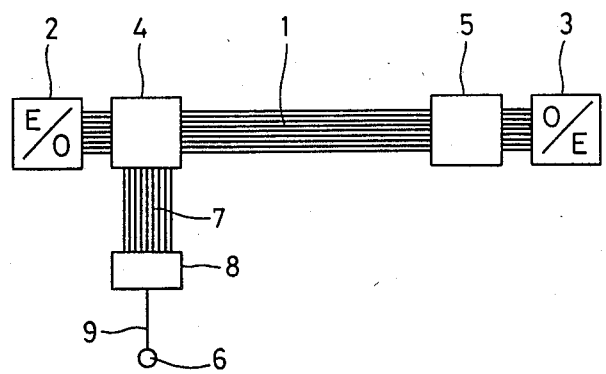
FIG. 2 is a block diagram illustrating an arrangement of another conventional optical transmission line monitoring system using an optical switch.
Figure 3:
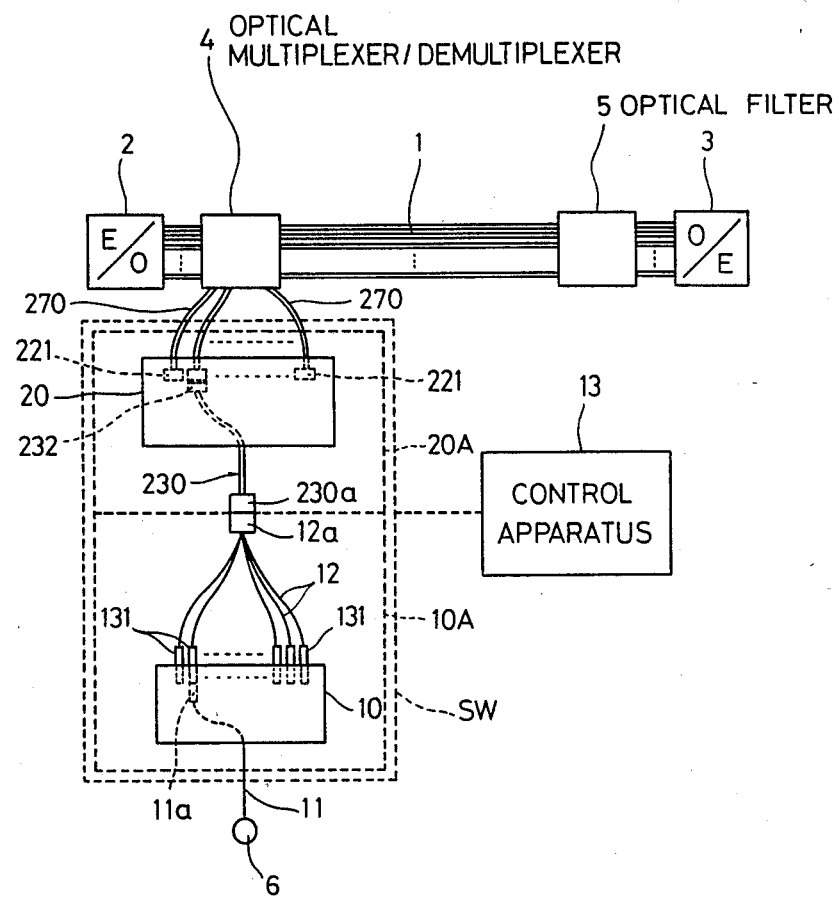
FIG. 3 is a block diagram illustrating a conceptual arrangement of an optical transmission line monitoring system to which an optical switch system according to the present invention is applied.

An optical switch system SW according to the present invention comprises a 1×n optical switch 10 as first optical switch means 10A and an n×m optical switch 20 as second optical switch means 20A, as shown in FIG. 3. The optical switch system SW is used, for example, in a monitoring system for monitoring optical communication lines 1 composed of numerous optical fibers (m optical fibers) for transmission of optical signals with wavelength λ1 therethrough. An electro-optic converter 2 is provided at one end of the optical communication lines 1, and an opto-electric converter 3 at the other end of the same. To permit monitoring of the connections of the lines 1, an optical multiplexer/demultiplexer 4 is provided on the side of the electro-optic converter 2, while an optical filter 5 is provided on the side of the opto-electric converter 3. The optical switch system SW of the present invention is connected between the optical multiplexer/demultiplexer 4 and a single OTDR 6.

The 1×n optical switch 10 serves to optically connect one end face of a single, first optical fiber 11 selectively to one end face of any of second optical fibers 12 including n fibers (e.g., 10 fibers). The other end of the first optical fiber 11 is connected to the OTDR 6. The n×m optical switch 20 serves to optically connect end faces of third optical fibers 230, which include n fibers and have other end faces individually optically connected to the other end faces of the second optical fibers 12, collectively to individual end faces of fourth optical fibers of a desired bundle (fourth optical fibers) 270 substantially synchronously. A desired fiber bundle is selected from a plurality of (e.g., 1,000) optical fiber bundles 270 each composed of n fourth optical fibers. The fourth optical fibers constituting the fiber bundles 270 are optically connected to individual ones of m optical fibers (e.g., 10,000 fibers) of the optical communication lines 1 by means of the optical multiplexer/demultiplexer 4.

In the 1×n optical switch 10, connection of the end face of the first optical fiber 11 selectively to the end face of any one of the second optical fibers 12 may be effected, for example, in the following manner. One end of each of the second optical fibers 12 is previously connected to a corresponding one of n aligned adapters 131, and a ferrule 11a is connected to one end of the first optical fiber 11. The ferrule 11a is connectible to any one of the n adapters 131, and has a distal end face at which the above-mentioned end face of the optical fiber 11 is exposed. By coupling the ferrule 11a to a desired one of the adapters 131 by means of a switching device, not shown, the first optical fiber 11 is connected to a desired one of the second optical fibers 12 at their end faces.

The face-to-face connection of the optical fiber bundle 230, i.e., third optical fibers, to one of the optical fiber bundles 270, i.e., fourth optical fibers, may be effected in the n×m optical switch 20 as follows, for example. One end of the optical fiber bundle 230 composed of n third optical fibers is previously connected to a multiple-fiber connector (master connector) 232. A multiple-fiber connector 221, which is connectible to the master connector 232, is connected to one end of each of the optical fibers bundles 270 each composed of n fourth optical fibers. At the connection end faces of the multiple-fiber connectors 232 and 221 are exposed the end faces of the third and fourth optical fibers, respectively, at predetermined positions with predetermined intervals. The multiple-fiber connectors 221 (e.g., 1,000 in number) are arranged in a matrix, for example, and a desired one of these connectors 221 is connected to the master connector 232 at their end faces, by means of a switching device, not shown. When the connectors 221 and 232 are connected at their end faces, the end faces of the optical fibers exposed at the respective connection end faces of the connectors are optically connected to each other collectively and synchronously. The face-to-face connection of the connectors 221 and 232 may be effected by fitting a guide pin (alignment pin) projecting from the connection end face of one of the connectors, preferably the master connector 232, into a hole bored in a predetermined position of the connection end face of the other connector (multiple-fiber connector 221), thereby positioning the connectors with high precision and with ease.

The switching of the ferrule 11a in the 1×n optical switch 10 and the master connector 232 in the n×m optical switch 20 is controlled in a predetermined manner automatically or manually by a control apparatus 13 connected to the optical switch system SW. Alternatively, the switches 10 and 20 may be controlled by individual control apparatuses.

As the aforesaid optical fiber bundles 230 and 270, optical fiber ribbons having 10 fibers, for example, may be used. In this case, existing multiple-fiber connectors 230a and 12a may preferably be used to connect the optical fiber bundle 230 to the n second optical fibers 12.

In this manner, the OTDR 6 for monitoring optical fibers is optically connected to the optical communication lines 1 via the optical switch system SW according to the present invention and the optical multiplexer/demultiplexer 4. The optical communication lines 1 can be monitored with the single OTDR 6, by operating the optical switch system SW.

Let it be assumed that the optical switch system SW includes 1,000 multiple-fiber connectors 221 each holding a fiber ribbon 270 having 10 fibers (i.e., n=10) and accordingly the optical communication lines 1 composed of 10,000 optical fibers are monitored by the OTDR 6. In this case, the monitoring light from the OTDR 6 is output to the 10,000 optical communication lines 1 through 10 output terminals of the 1×n optical switch 10 and 1,000 output terminals of the n×m optical switch 20, requiring 1,010 switching terminals in total. Thus, the number of switching terminals to be used in the optical switch system SW is small, whereby the system can be reduced in size and its switching operation can be facilitated.

Figure 4:
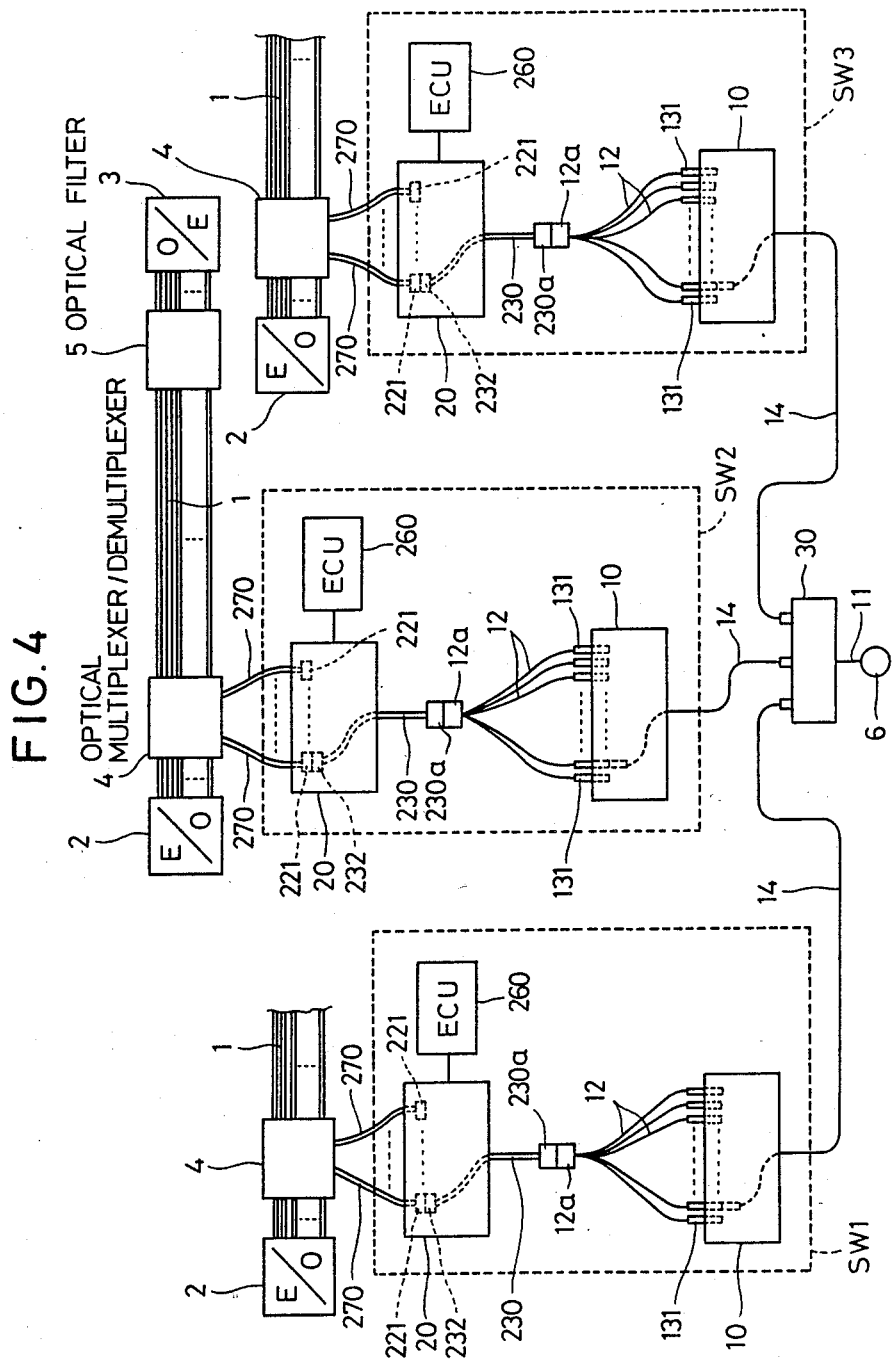
FIG. 4 is a block diagram illustrating another example of using the optical switch system of the present invention.

FIG. 4 shows another example of utilizing the optical switch system SW of the present invention. Three optical switches SW1–SW3 each having an arrangement similar to the above-described one are connected to three groups of optical communication lines 1, respectively. The optical fibers 11 of the three 1×n optical switches 10 are connected to the OTDR 6 by means of a 1×3 optical switch 30 serving as third optical switch means.

By thus grouping the optical switch systems SW, three groups of optical communication lines 1, e.g., 30,000 optical fibers in total, can be monitored with the single OTDR 6. In this case, the monitoring light from the OTDR 6 is output to the optical communication lines 1 through three output terminals of the 1×3 optical switch 30 and through 3,030 output terminals of the 1×n and n×m optical switches 10 and 20 (i.e., 3(10+1,000)). Thus, 30,000 optical communication lines 1 can be monitored by use of only 3,033 switching terminals in total.

Figure 5:
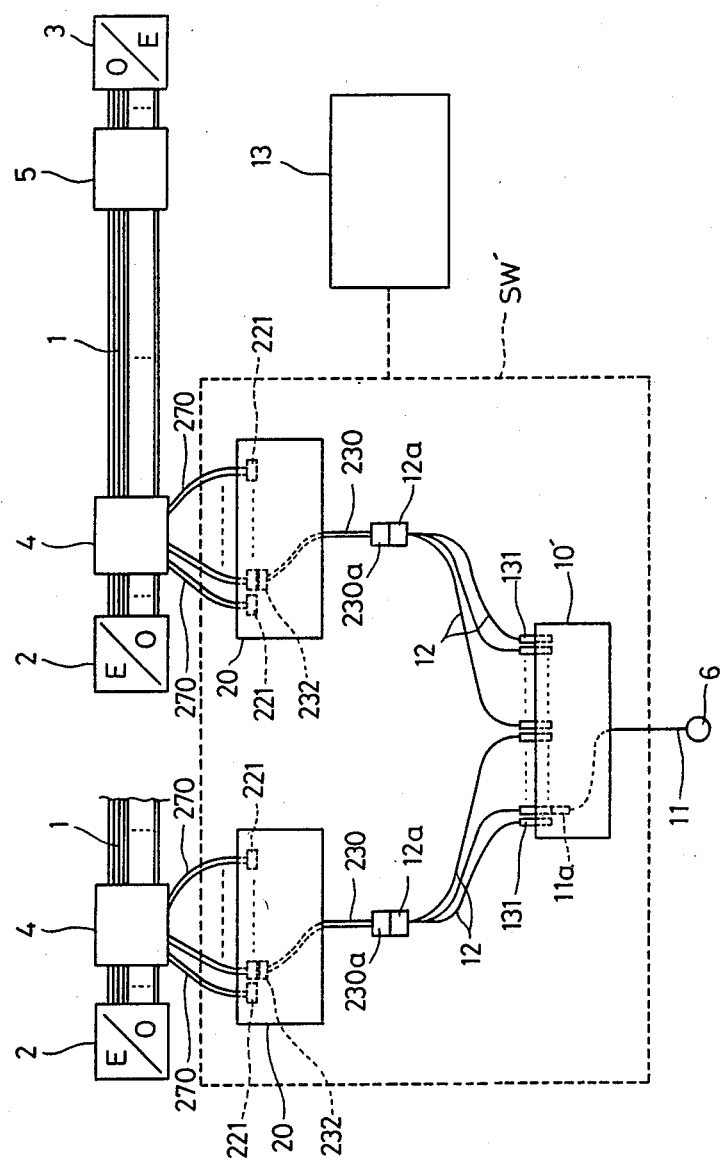
FIG. 5 is a block diagram illustrating a modification of the optical switch system of the invention.

FIG. 5 shows a modification of the optical switch system of the present invention. This optical switch system SW' includes one 1×2n optical switch 10' and two n×m optical switches 20 connected to the switch 10'. In this case, if the 1×2n optical switch 10' is regarded as two 1×n optical switches 10 coupled together, then the optical switch system SW' can be considered to be a combination of two optical switch systems SW shown in FIG. 3. In FIG. 5, like reference numerals are used to denote like elements or parts in FIG. 3, and description thereof is omitted.

Figure 6:
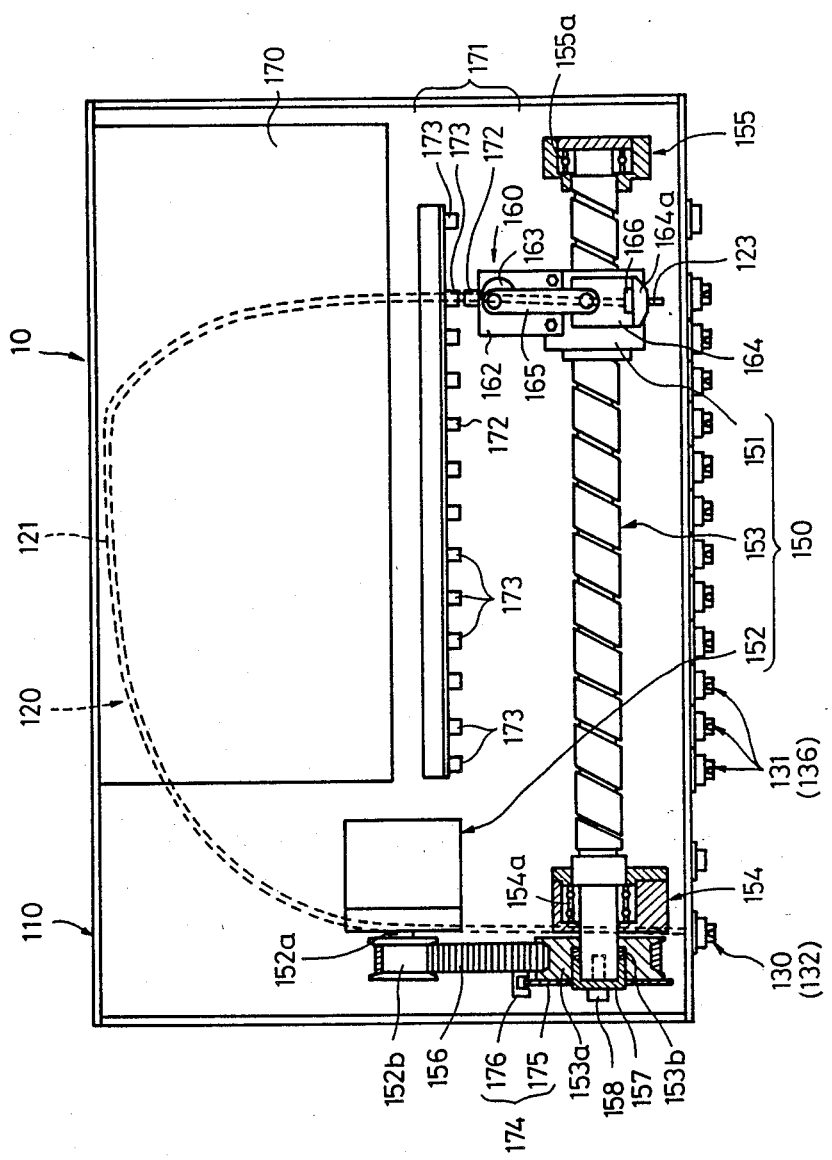
FIG. 6 is a plan view, partly in section, of a 1×n optical switch.
Figure 7:
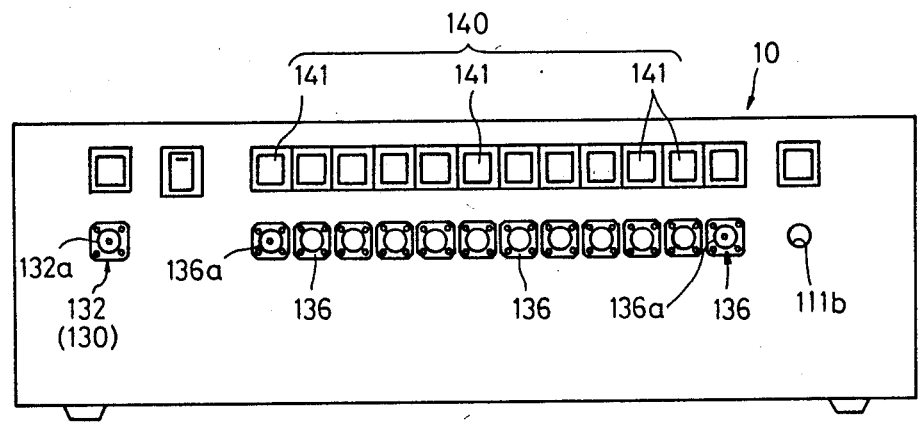
FIG. 7 is a front view of the optical switch shown in FIG. 6.
Figure 8:
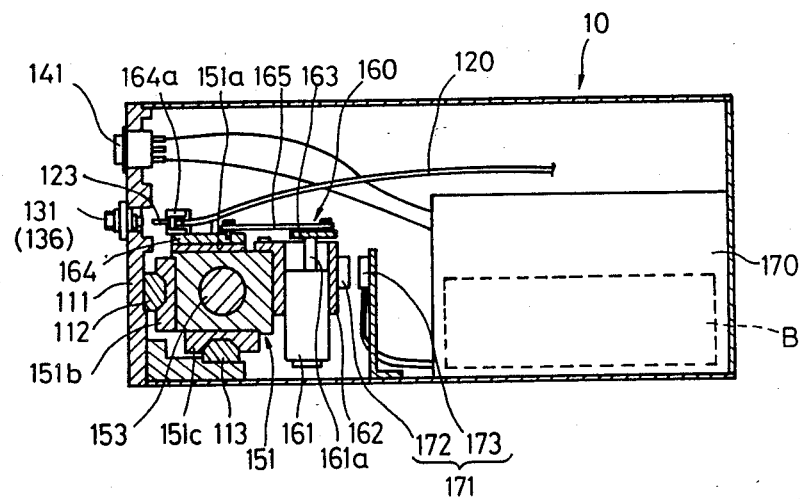
FIG. 8 is a partly-cutaway side view of the optical switch of FIG. 6.

As the 1×n optical switch 10 of the optical switch system SW, one shown is FIGS. 6 to 8 may be used, for example. This 1×n optical switch 10 comprises a switching line 120 contained in a box-like housing 110 and having a single optical fiber 121 connected at one end to a plug 122 and at the other end to a ferrule 123, a common adapter 130 attached to a front panel 111 of the housing 110 to be connected externally with one end of the single optical fiber 11, and a plurality of adapters 131 attached to the front panel 111 to be connected externally with individual ends of a fiber ribbon (not shown) composed of a plurality of fibers. The switch 10 further comprises a first selector 140 for selecting a desired one of the adapters 131, a first conveyor 150 for moving the aforementioned ferrule 123 to the adapter 131 selected by the first selector 140, a first coupler/decoupler 160 for connecting and disconnecting the ferrule 123, moved by the first conveyor 150, to and from the selected adapter 131, and a first controller 170 for controlling the movement, connection and disconnection of the ferrule 123.

The switching line 120 serves to effect a single-fiber connection between the single optical fiber 11 and the end of each fiber of the fiber ribbon. The plug 122 at one end of the switching line 120 is connected to the common adapter 130, while the ferrule 123 at the other end of the same is connectible to any one of the adapters 131 mentioned above.

Figure 9:
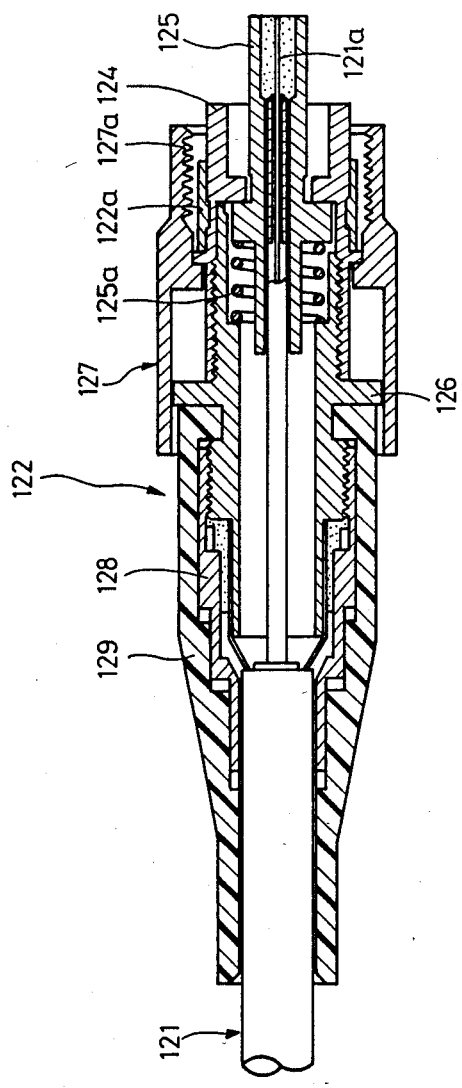
FIG. 9 is a sectional view of a plug for an optical fiber switching line.

The plug 122 includes a ferrule 125 inserted into a cylindrical plug frame 124, a stopper 126 screwed into a rear end of the plug frame 124, and a pressure spring 125a arranged between the ferrule 125 and the stopper 126 so as to urge the ferrule 125 outward, as shown in FIG. 9. A coupling nut 127 having a thread 127a on its inner peripheral surface is fitted on the plug frame 124 through a turn-preventing ring 122a. A holder 128 is screwed onto the rear end of the stopper 126, and a synthetic resin hood 129 is fitted on the rear end portion of the plug 122.

With this structure, the ferrule 125 is slightly retractable off from the plug frame 124 toward the stopper 126; however, it is subjected at all times to the urging force (about 1 kg·f) of the pressure spring 125a and projected from the end of the plug frame 124. A plug (not shown) which is similar in structure to the above-mentioned plug 122 is provided at the end of the single optical fiber 11 and at each end of the fiber ribbon so as to be connected to the 1×n optical switch 10.

Figure 10:
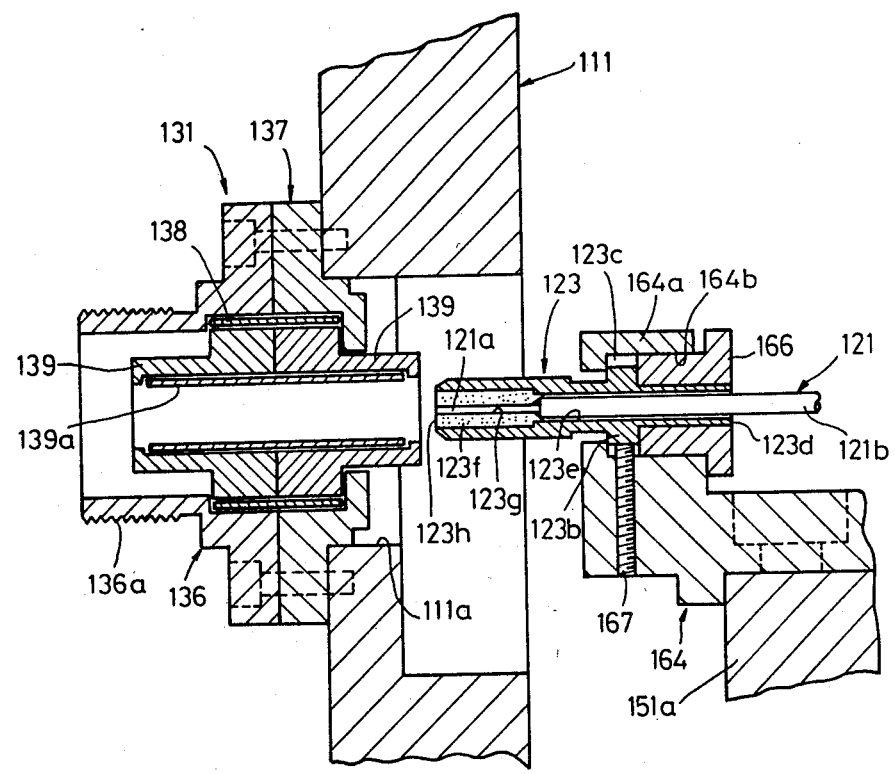
FIG. 10 is an enlarged sectional view illustrating the positional relationship of a ferrule for the optical fiber switching line and an adapter associated therewith.

The ferrule 123, on the other hand, is arranged on a slide table 164 which will be described hereinafter, as shown in FIG. 10. The ferrule 123 is fitted through an insertion hole 164b bored through a mounting portion 164a at a front end of the slide table 164, and is prevented from slipping therefrom by a sleeve member 166 abutting against the rear end face of its flange portion 123b.

Figure 11:
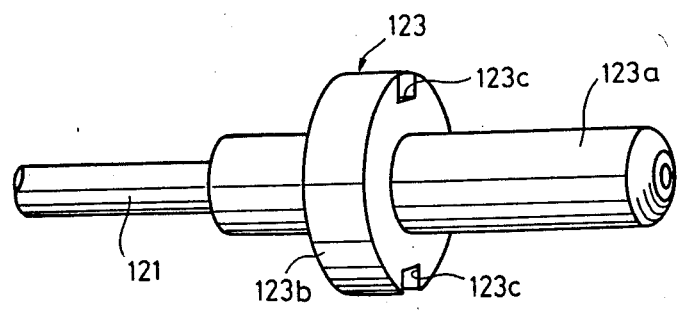
FIG. 11 is a perspective view of the ferrule for the optical fiber switching line.
Figure 12:
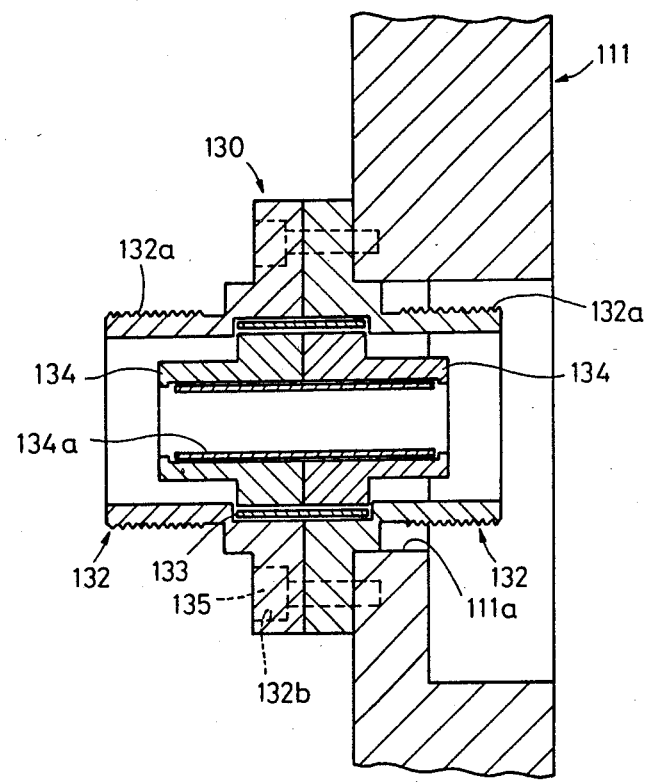
FIG. 12 is an enlarged sectional view of a common adapter.

The ferrule 123 is identical in shape with the ferrule 125 for the plug 122 and includes, as shown in FIG. 11, a cylindrical portion 123a with a tapered end, and the flange portion 123b formed integrally at the rear side of the cylindrical portion 123a. The flange portion 123b is partly cut off to form positioning grooves 123c to be situated above and beneath the axis of the ferrule 123. The ferrule 123 has therein a large-diameter insertion hole 123e extending along the axis thereof from its proximal end face to an approximately middle portion to receive a sheathed portion 121b of the optical fiber 121. A guide 123f made of ceramic, for example, is fitted in the distal end portion of the ferrule 123 adjacent to the insertion hole 123e. The guide 123f has an insertion hole 123g coaxial with the insertion hole 123e and extending through the guide 123f up to the distal end face 123h of the ferrule 123. A bare or unsheathed portion 121a of the optical fiber 121 is fitted through the insertion hole 123g.

The optical fiber 121 is inserted into the ferrule 123 from the proximal end 123d, and its bare fiber portion 121a is secured in the insertion hole 123g by an adhesive, thus obtaining a finished ferrule 123. At this time, a part of the bare fiber portion 121a projecting outside the insertion hole 123g is cut off at the distal end face 123h of the ferrule 123 and is polished together with the end face 123h. In FIG. 10, reference numeral 167 designates a spring pin which is abutted against one of the grooves 123c cut in the ferrule 123 so as to fix the ferrule 123 in the insertion hole 164b of the slide table 164.

The common adapter 130 serves to effect a single-fiber connection between the outside plug provided at one end of the single optical fiber 11 and the inside plug 122 of the switching line 120. The adapter 130 is composed of two square base plates 132 each having a threaded portion 132a which protrudes from a central portion thereof and onto which the coupling nut 127 of the plug 122 or the plug of the single optical fiber 11 is fitted. The base plates 132 are, with their rear end faces opposed to each other, fitted in a mounting hole 111a bored through the front panel 111. Inside the common adapter 130 two sleeve holders 134 are fitted through a guide ring 133 extending along the inner peripheral surfaces of the base plates 132. A common sleeve 134a is fitted in the inner peripheries of the sleeve holders 134, for holding the ferrule 125 of the plug 122. The common adapter 130 is secured to the front panel 111 by means of a desired number of screws 135 screwed into holes 132b bored through the base plates 132.

On the other hand, the adapter 131 serves to achieve a single-fiber connection between the external plug provided at each end of the twelve-fiber ribbon and the internal ferrule 123 of the switching line 120. The adapter 131 having two base plates 136 and 137 is substantially identical in structure with the common adapter 130 and, as shown in FIG. 10, fitted in the mounting hole 111a in the front panel 111. The base plate 136 has a threaded portion 136a projecting from its central portion so that the plug (not shown) provided at each end of the fiber ribbon is fitted on the portion 136 from outside. No threaded portion, however, is formed on the other base plate 137. Two sleeve holders 139 are fitted in the adapter 131 with a guide ring 138 interposed therebetween which extends along the inner peripheries of the base plates 136 and 137. A common sleeve 139a for holding the ferrule to be inserted is fitted in the inner peripheries of the two sleeve holders 139.

The illustrated example includes twelve adapters 131 provided on the front panel 111. The number of adapters, however, may be changed as desired, depending on the number of fibers of a fiber ribbon to be used. In FIG. 7, reference numeral 111b denotes a through hole bored through the front panel 111 as a dummy adapter for the ferrule 123. The end face of the ferrule 123 can be projected outside through this hole 111b so that it can be cleaned.

The ferrule 123 is thus firmly fixed in the mounting portion 164a at the front end of the slide table 164 so as to leave no gap. The adapter 131, to which this ferrule 123 is connected, is also connected from outside with the fiber ribbon plug having a similar structure to the plug 122, whereby loss of single-fiber connection can be lowered. This is achieved by the ferrule of each plug of the fiber ribbon which is allowed to move slightly rearward, and by the pressure spring arranged in the plug for urging the plug against the distal end face 123h of the ferrule 123 with a force of about 1 kg·f.

The first selector 140 is provided for selecting a desired one of the aforementioned twelve adapters 131 to which the ferrule of the switching line 120 is to be connected, in accordance with an operation of the operator. More specifically, the first selector 140 includes twelve push-button switches 141 arranged on the front panel 111 above the respective adapters 131, as shown in FIG. 7. The switches 141 are connected to the first controller 170 arranged at the rear portion of the housing 110, such that when a desired switch 141 is pressed, a selection signal indicative of the adapter 131 corresponding to this switch is delivered to the first controller 170.

The first conveyor 150 serves to move a transport table 151 to a position corresponding to the adapter 131 selected by the first selector 140. The first conveyor 150 includes the transport table 151, a pulse motor 152, and a ball screw 153, as shown in FIG. 6. The transport table 151 is fitted on the ball screw 153 so as to be movable in the axial direction of the same. When a desired switch 141 is depressed, the transport table 151 is first moved to a preset origin point, e.g., a position corresponding to the leftmost adapter 131 in the front panel 111, and then moved to a position corresponding to the selected adapter 131, while being controlled by the first controller 170 which will be described hereinafter.

The transport table 151 carries thereon the slide table 164 to which the ferrule 123 of the switching line 120 is attached, so that the ferrule 123 is moved to the position corresponding to the selected adapter 131. The transport table 151 has, as shown in FIG. 8, linear guides 151b and 151c formed at its front and bottom portions, respectively, and extending parallel to the front panel 111. The linear guides 151b and 151c engage with guide rails 112 and 113 attached respectively to the rear surface of the front panel 111 and the bottom surface of the housing 110, so as to guide the transport table 151 horizontally (in the axial direction of the ball screw 153).

Suitable numbers of revolutions of the pulse motor 152 are set previously based on the pitch of the ball screw 153, so that the transport table 154 carrying the ferrule 123 can be moved to any adapter 131 selected by the first selector 140. Any existing pulse motor may be used for this purpose so far as it can perform the operation mentioned.

The ball screw 153 is supported at opposite ends by supports 154 and 155 through bearings 154a and 155a, respectively, and is rotated by means of a timing belt 156 which is wound around a pulley 153a provided at the end of the ball screw 153 and a rotary shaft 152a of the pulse motor 152. An elastic ring 153b is interposed between the pulley 153a and the ball screw 153, and a cap 157 is fitted on the end of the ball screw 153 and secured thereto by a bolt 158 so as to urge the elastic ring 153b, whereby the pulley 153a is securely attached to the ball screw 153.

The first coupler/decoupler 160 is disposed in the rear of the transport table 151 and composed of, as shown in FIGS. 6 and 8, a motor 161, a retainer 162 for retaining the motor 161, a cam 163 attached to the rotary shaft 161a of the motor 161, the slide table 164, and a connecting arm 165 coupled at one end to the cam 163 and at the other end to the slide table 164.

The slide table 164 is arranged on the linear guide 151a situated at the front portion of the transport table 151, so as to be slidable back and forth at right angles to the axis of the ball screw 153. The connecting arm 165 is coupled to the cam 163 by means of a pin eccentric with the cam 163, such that as it moves, the slide table 164 is moved back and forth to cause the ferrule 123 of the switching line 120 to be connected and disconnected to and from the selected adapter 131.

The first controller 170 controls the operation of the pulse motor 152 and the motor 161. To the first controller 170 are electrically connected a proximity sensor 171, an optical limit switch 176 of an encoder 174, etc.

The proximity sensor 171 comprises a detection head 172 situated at the rear of the support 162, and thirteen detection elements 173 which are situated at the rear of the corresponding adapters 131 and the through hole 111b to be detected by the detection head 172 as connection positions for the respective adapters 131 and the through hole 111b. Among the detection elements 173, the leftmost one close to the motor 152 serves as a deceleration switch for decelerating the movement of the transport table 151 when the transport table 151 returns to the leftmost adapter 131 as the origin point.

The encoder 174 serves as a controller for detecting the origin point, which includes a disc 175 having a radially extending slit, and an optical limit switch 176 attached to the bottom wall of the housing 110 in the vicinity of the pulley 152b.

In FIG. 8, symbol B denotes a battery for supplying electric power to the 1×n optical switch 10.

The 1×n optical switch 10 constructed in this manner is used as follows:

First, the plug of the single optical fiber 11 connected to the OTDR 6 and the threaded portion 127a of the coupling nut 127 are fitted on the threaded portions 132a of the common adapter 130. Thus, the single optical fiber 11 and the switching line 120 are connected together by the common adapter 130.

Then, the plug connected at each terminal of the fiber ribbon is fitted externally onto the threaded portion 136a of the corresponding adapter 131. Hence, the 1×n optical switch 10 is connected to the single optical fiber 11 and the terminals of the fiber ribbon.

Among the twelve adapters 131 provided on the front panel 111, a desired one to be connected to the ferrule 123 is selected by pressing the corresponding push-button switch 141, which then delivers a selection signal indicating the selected adapter to the controller 170.

Based on the selection signal, the controller 170 first actuates the motor 161 of the coupler/decoupler 160. As the motor 161 is actuated, the cam 163 rotates to move the connecting arm 165 backward. As a result, the slide table 164 is moved backward, so that the ferrule 123 of the switching line 120 is disconnected from the adapter 131 to which the ferrule 123 has been connected.

The controller 170 then issues a command to the pulse motor 152 for moving the transport table 151 to the preset origin point, i.e., the position corresponding to the leftmost adapter 131 on the front panel 111. The pulse motor 152 is actuated by this command, such that rotation thereof is transmitted to the ball screw 153 through the timing belt 156. As the ball screw 153 is rotated, the transport table 151 engaging the screw 153 is moved toward a position close to the leftmost adapter 131 on the front panel 111.

When the detection head 172 passes by the leftmost detection element 173 serving as the deceleration switch in the course of movement of the transport table 151, a signal from the detection head 172 is supplied to the controller 170. Upon receiving this signal, the controller 170 delivers a command to the pulse motor 152 to decelerate its rotation.

The transport table 151, which is decelerated by means of the pulse motor 152, is moved accurately to the origin point corresponding to the leftmost adapter 131 of the front panel 111 while its position is controlled by the encoder 174 composed of the slitted disc 175 and the limit switch 176. When the controller 170 receives a signal from the encoder 174, it stops the pulse motor 152.

After the transport table 151 is returned to the origin point in this manner, the controller 170 again actuates the pulse motor 152 to move the transport table 151 to the selected adapter 131.

When the transport table 151 reaches the selected adapter 131, the detection head 172 detects the detection element 173 corresponding to the selected adapter 131 and delivers a detection signal to the controller 170. Upon receiving the detection signal from the head 172, the controller 170 stops the rotation of the pulse motor 152, thereby stopping the transport table 151 at the selected adapter 131.

The controller 170 then provides a command to the motor 161 of the coupler/decoupler 160, to actuate the motor 161 at this time in the opposite direction, i.e., to couple the ferrule 123 of the switching line 120 to the selected adapter 131. The above-mentioned operation of the 1×n optical switch is repeated to connect the switching line 120 sequentially to the adapters 131. Thus the switching line 120 is sequentially connected to the terminals of the fiber ribbon at their end faces, thereby switching the optical transmission lines.

The foregoing explanation is given on the assumption that the number n of fibers of the fiber ribbon is 12. A fiber ribbon having a different number of fibers may of course be used. Moreover, instead of using the push-button switches 141, the selector 140 may be designed to be remote-controlled by a selection signal delivered from an external computer. Such remote-controlled selector may be achieved, for example, by providing an RS-232 terminal in the housing 110, connecting the selector to this terminal, and by generating a selection signal to sequentially select the adapters 131 by the execution of a predetermined program.

Figure 13:
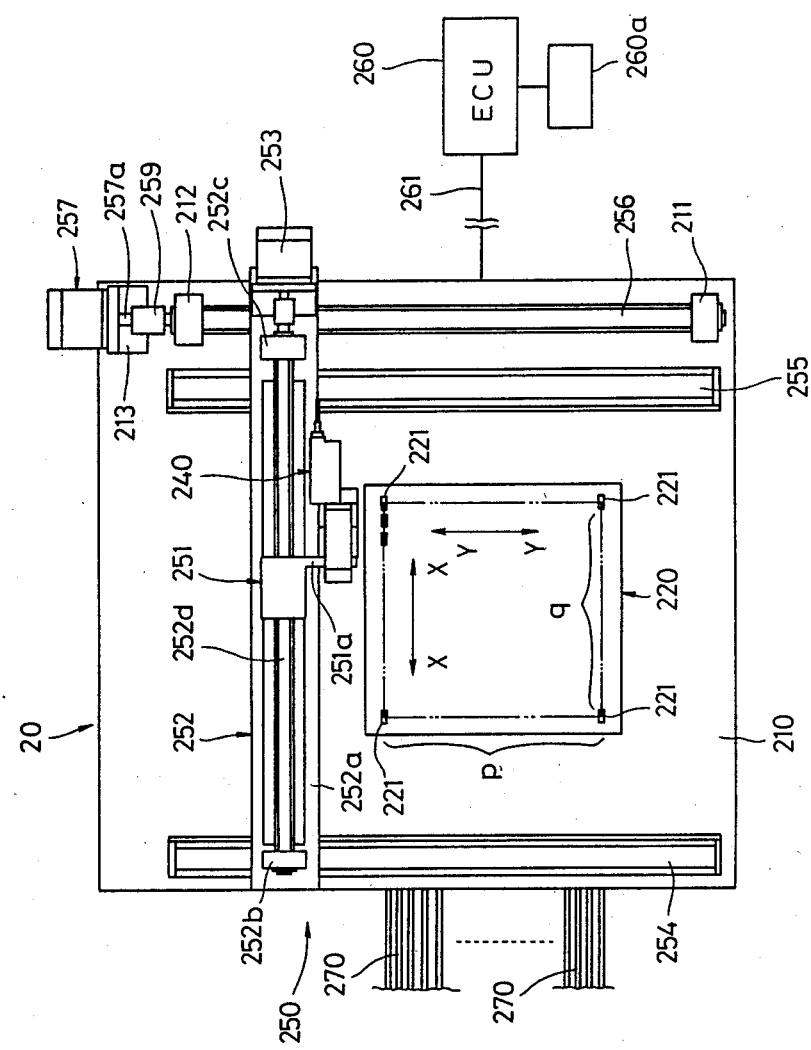
FIG. 13 is a plan view illustrating an n×m optical switch.
Figure 14:
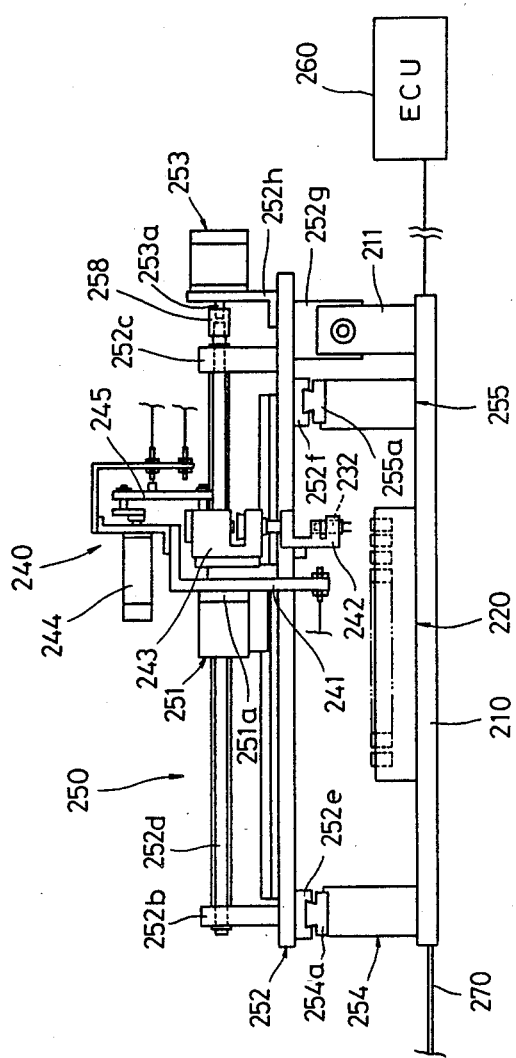
FIG. 14 is a front view of the optical switch shown in FIG. 13.

The n×m optical switch 20 of the optical switch system SW shown in FIG. 3 may be constructed as shown in FIGS. 13 and 14. The n×m optical switch 20 comprises a connector holder 220 situated on a base 210 and having p×q multiple-fiber connectors 221 arranged in a matrix, and a master connector 232 connected to the ends of n optical fibers and selectively connected to a desired one of the multiple-fiber connectors 221 on the connector holder 220. The n×m optical switch 20 further comprises a second coupler/decoupler 240 for connecting the master connector 232 held thereby to a desired multiple-fiber connector 221 on the connector holder 220, a second conveyor 250 for moving the second coupler/decoupler 240 in two-dimensional directions above the connector holder 220, a second selector 260a for producing a selection signal for selection of one of the multiple-fiber connectors 221, and a second controller 260 for controlling the movement, connection and disconnection of the master connector 232.

Figure 15:
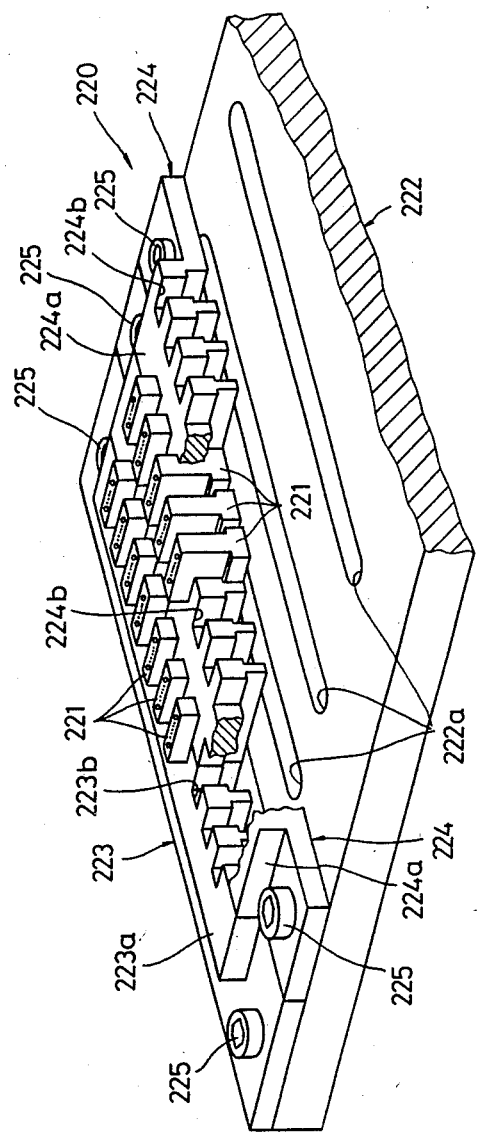
FIG. 15 is a perspective view showing part of a connector holder.

The connector holder 220 includes, as shown in FIG. 15, numerous (p×q) multiple-fiber connectors 221, a base plate 222, and two different types of holders 223 and 224 securely mounted on the base plate 222.

Figure 16:
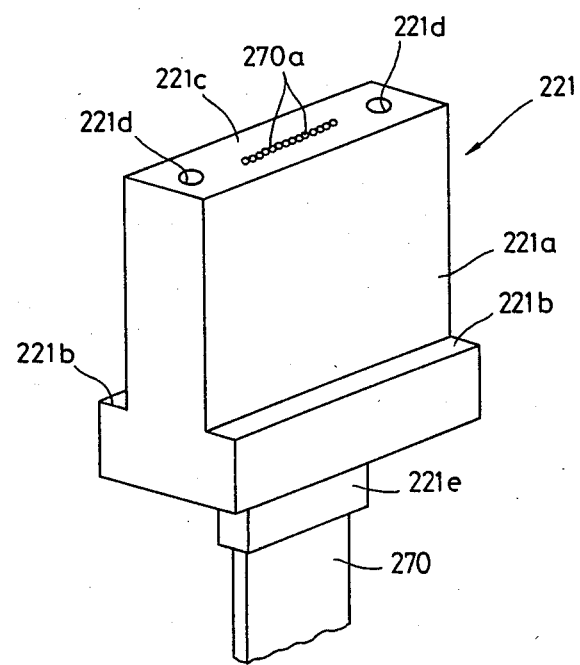
FIG. 16 is an enlarged perspective view of a multiple-fiber connector.

Each of the multiple-fiber connectors 221 is, for example, connected to one end of the n-fiber (e.g., 10-fiber) ribbon 270 which is connected at the other end to the optical multiplexer/demultiplexer 4. The connectors 221 thus serve to optically connect the n×m optical switch 20 to the optical communication lines 1 through the optical multiplexer/demultiplexer 4. As shown in FIG. 16, each multiple-fiber connector 221 has a rectangular body 221a in which the end of the fiber ribbon 270 is embedded. The body 221a has two stepped portions 221b on its widthwise opposite sides, which serve as stoppers when fitted in engaging grooves 223b and 224b of the holders 223 and 224, and a connection end face 221c at a front portion thereof at which the polished end faces 270a of the fibers of the ribbon 270 are exposed. Two holes 221d for receiving pins are bored in the connection end face 221c on its longitudinally opposite sides between which the end faces 270a of the fibers are situated. Reference numeral 221e designates a rubber boot arranged at the rear of the body 221a for protecting the fiber ribbon 270 from being bent.

The base plate 222, which is secured at a predetermined position on the base 210, has a plurality of elongated parallel holes 222a bored therethrough and extending longitudinally for passing the fiber ribbons 270 and the rubber boots 221e of the multiple-fiber connectors 221.

Figure 17:
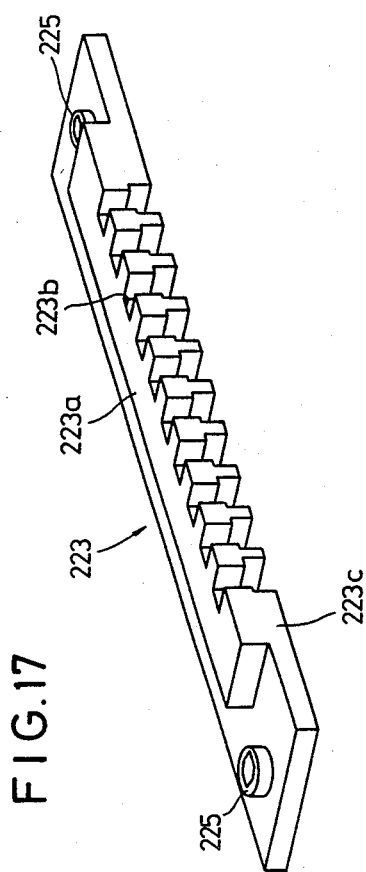
FIG. 17 is a perspective view of a holder 223 shown in FIG. 15.
Figure 18:
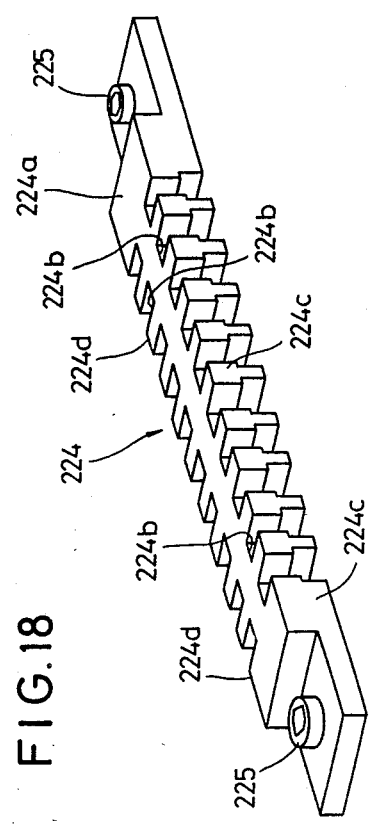
FIG. 18 is a perspective view of a holder 224 shown in FIG. 15.

The aforementioned holders 223 are disposed on opposite sides of the base plate 222. As shown in FIG. 17, each holder 223 has a thick portion 223a formed on one side thereof close to its corresponding elongated hole 222a. The thick portion 223a has its side vertically cut to form stepped engaging grooves 223b aligned longitudinally for receiving the multiple-fiber connectors 221. The holder 224, on the other hand, is situated between the holders 223 and has a thick portion 224a corresponding in position to the thick portion 223a of the holder 223, as shown in FIG. 18. The thick portion 224a has its opposite sides 224e and 224d cut, like the thick portion 223a of the holder 223, to form stepped engaging grooves 224b.

In securing the holders 223 and 224 to the base plate 222, the multiple-fiber connectors 221 whose connection end faces 221c are directed upward are previously engaged with their stepped portions 221b fitted in the engaging grooves 223b and 224b, then the holders 223 and 224 are secured at their longitudinally opposite ends to the base plate 222 by means of bolts 225. In this manner, the multiple-fiber connectors 221 are securely arranged on the connector holder 220 in the form of a matrix wherein p connectors are aligned in the longitudinal direction while q connectors are aligned in the lateral direction. The matrix arrangement of the connectors and the use of the fiber ribbons 270 contribute to reduction of the area of the connector holder 220 to a smaller value than in the case of using single-fiber connectors. The multiple-fiber connectors 221 are each supported half by the holder 223 and half by the holder 224 adjacent to the holder 223.

Figure 19:
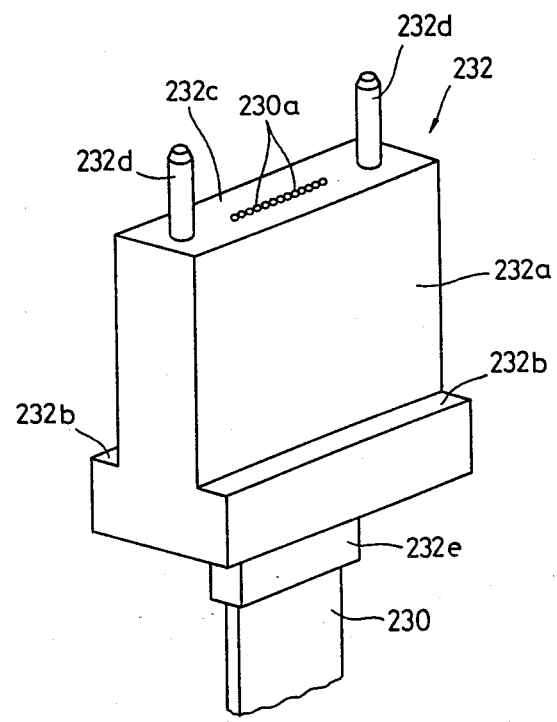
FIG. 19 is an enlarged perspective view showing a master connector.
Figure 20:
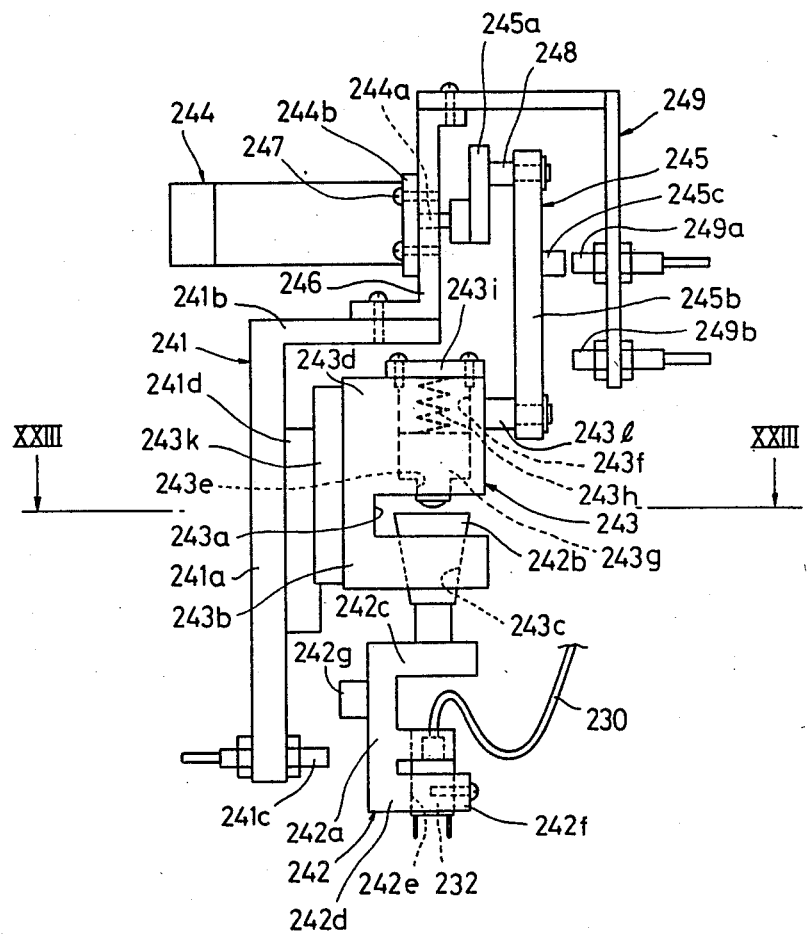
FIG. 20 is a front view of a coupler/decoupler.
Figure 21:
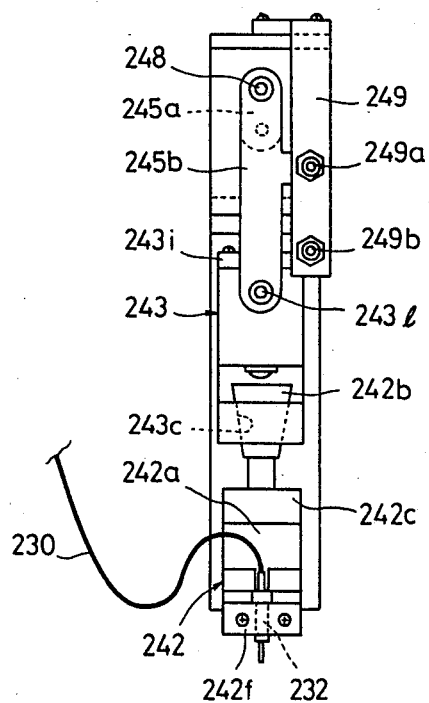
FIG. 21 is a side view of the coupler/decoupler shown in FIG. 20.
Figure 22:
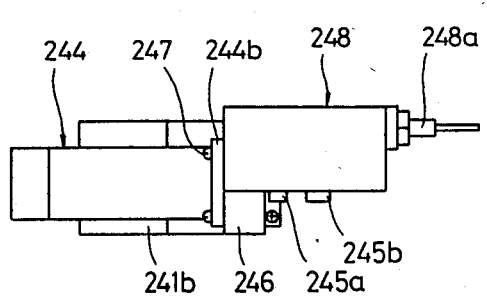
FIG. 22 is a plan view of the coupler/decoupler in FIG. 20.
Figure 23:
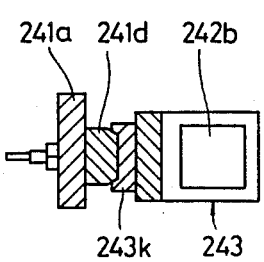
FIG. 23 is a sectional view taken along line XXIII—XXIII in FIG. 20.

As shown in FIG. 19, the master connector 232 is substantially identical in shape with the multiple-fiber connector 221. A body 232a of the connector 232 has stepped portions 232b which serve as stoppers. The polished end faces 230a of the fibers of the ribbon 230 are exposed at a connection end face 232c at the front portion of the body 232a. Two alignment pins 232d having tapered distal ends project from the connection end face 232c corresponding in position to the above-mentioned holes 221d. A rubber boot 232e is provided at the rear portion of the body 232a for protecting the fiber ribbon 230 from being bent.

The second coupler/decoupler 240 is attached to a movable table 251 of the second conveyor 250, which will be described hereinafter. As shown in FIGS. 20 to 23, the second coupler/decoupler 240 includes a support 241 attached to the movable table 251 for supporting the second coupler/decoupler 240, a retainer 242 for retaining the master connector 232, a lifter member 243 holding the retainer 242 and vertically movable relative to the support 241, a motor 244 for vertically moving the lifter member 243 to connect the master connector 232 to the selected multiple-fiber connector 221 at their end faces, and a coupling member 245 coupling the lifter member 243 and the motor 244.

The support 241 is a plate member of an inverted-L shape composed of a mounting plate 241a and an upper plate 241b secured to the upper end of the plate 241a. At the lower end of the mounting plate 241a is provided a connection sensor 241c which comprises a proximity sensor for ensuring the connection of the master connector 232 with the multiple-fiber connector 221. Under the upper plate 241b is situated a guide rail 241d which is attached to a central portion of one side surface of the mounting plate 241a and which extends vertically for guiding vertical movement of the lifter member 243.

The retainer 242 includes a mounting member 242a to which the master connector 232 is attached, and a position adjuster 242b coupled to the upper end of the mounting member 242a for adjusting the position of connection between the master connector 232 and the multiple-fiber connector 221. The mounting member 242a is generally C-shaped as viewed from the side and has an upper block 242c to which the lower end of the above-mentioned position adjuster 242b is attached, and a lower block 242d having a groove 242e for receiving the master connector 232. The master connector 232, fitted in the groove 242e, is fixed by means of a fixing plate 242f which is screwed to the front surface of the mounting member 242a. A detection element 242f projects from the side surface of the mounting member 242a facing the support 241. The detection element 242f is detected by the connection sensor 241c as indicative of a connection position for the master connector 232 and the multiple-fiber connector 221.

The position adjuster 242b, which is in the form of an inverted quadrangular pyramid with its broader face directed upward, is situated in a groove 243c cut in the lower portion of the lifter member 243 in such a manner that it can come in and out of the groove 243c. Thus, the position adjuster 242b serves as a suspension means by means of which the retainer 242 is hung from the lifter member 243. As the retainer 242 is moved upward relative to the lifter member 243, the position adjuster 242b is also moved upward. At this time, the position adjuster 242b is allowed to rotate slightly because of a gap formed between the adjuster 242b and the groove 243c. This rotation permits position adjustment of the master connector 232 with respect to the multiple-fiber connector 221 to be connected.

The lifter member 243 has a lateral groove 243a at its middle portion, thus being divided into upper and lower blocks. The lower block 243b has an inverted quadrangular pyramid-like groove 243c, in which the position adjuster 242b is received, as mentioned above, while the upper block 243d has a cylindrical hole 243f opening at an upper end, and a small-diameter through hole 243e extending from the bottom of the hole 243f. In this cylindrical hole 243f are arranged a plunger 243g slidable in the vertical direction and a spring 243h urging the plunger 243g downward. The upper open end of the cylindrical hole 243f is closed by a lid 243i screwed to the upper block. The plunger 243g has a protuberance 243j projecting integrally from its central bottom surface into the above-mentioned through hole 243e and having a distal end face disposed in a facing relation to the position adjuster 242b. The distal end face of the protuberance 243j is spaced at a small distance from the position adjuster 242b when the protuberance 243j of the plunger 243g which is urged downward has its distal end projected from the upper block 243d. On one side of the lifter member 243 close to the support 241 is provided a slide guide 243k which engages the guide rail 241d of the support 241 for guiding the vertical movement of the lifter member 243, and on the other side of the member 243 a pin 243l coupled to the connecting member 245 is provided.

As the spring 243h, a spring having small elastic constants should preferably be used so that its urging force acting on the master connector 232 held by the retainer 242 is approximately 1 kg·f and does not change much. By using such spring, a substantially constant urging force can be produced when the multiple-fiber connector 221 and the master connector 232 are connected together, and therefore damage of these connectors can be avoided.

The motor 244 is secured to a crank-like mounting plate 246 attached to the upper portion of the upper plate 241b of the support 241. The motor 244 has a rotary shaft 244a inserted through a hole 246a bored through the mounting plate 246, and a flange 244b secured to the mounting plate 246 by means of a plurality of bolts 247 situated around the insertion hole 246a.

The connecting member 245 has a rotary arm 245a and a link arm 245b. The rotary arm 245a has one end attached to the rotary shaft 244a of the motor 244 and has the other end rotatably connected through a connecting pin 248 to one end of the link arm 245b. The other end of the link arm 245b is rotatably coupled to the connecting pin 243h of the lifter member 243. Reference numeral 245c denotes a detection element formed on the link arm 245b. The detection element 245c is used to learn the upper-limit position and lower-limit position of the master connector 232, which are detected by an upper-limit sensor 249a and a lower-limit sensor 249b, respectively, arranged at upper and lower portions of a sensor bracket 249 opposite to the detection element 245c. The bracket 249 extends from the upper portion of the mounting plate 246 over the connecting member 245.

The second conveyor 250 serves to move the second coupler/decoupler 240 in the two-dimensional directions above the connector holder 220. As shown in FIGS. 13 and 14, the second conveyor 250 is composed of the movable table 251 to which the support 241 of the second coupler/decoupler 240 is attached, a movable stage 252 carrying the movable table 251 thereon such that the table 251 is movable laterally as indicated by arrow X—X in FIG. 13, a first motor 253 disposed on the movable stage 252 for moving the movable table 251, and rail supports 254 and 255 arranged on the opposite sides of the base 210 and carrying the movable stage 252 thereon such that the stage 252 is movable longitudinally as indicated by arrow Y—Y in FIG. 13. The second conveyor 250 further includes a ball screw 256 fitted into a drive bracket 252g projecting from the lower surface of the movable stage 252 adjacent to the first motor 253, for moving the movable stage 252 longitudinally (directions Y—Y), and a second motor 257 for rotating the ball screw 256.

The movable table 251 is bored at its central portion to form a hole (not shown) into which the ball screw 252d of the movable stage 252 is fitted. A mounting plate 251a is provided on one side of the movable table 251 and is attached to the side surface of the support 241 of the second coupler/decoupler 240.

The movable stage 252 is composed of a stage plate 252a, support brackets 252b and 252c situated on the longitudinally opposite sides of the stage plate 252a, the ball screw 252d rotatably supported by the support brackets 252b and 252c through bearings (not shown), slide guides 252e and 252f arranged on the lower surface of the stage plate 252a for engagement with the rail supports 254 and 255, and the drive bracket 252g fitted onto the ball screw 256.

The first motor 253 serves to move the movable table 251 laterally (directions X—X). The motor 253 is attached to a bracket 252h situated on the support bracket (252c)-side of the movable stage 252, and its rotary shaft 253a is coupled to one end of the ball screw 252d by means of a coupling ring 258.

The rail supports 254 and 255 have their upper portions provided with guide rails 254a and 255a engaging with the slide guides 252e and 252f of the movable stage 252, respectively. By means of the guide rails 254a and 255a, the movable stage 252 is rendered movable longitudinally (directions Y—Y).

The ball screw 256 is rotatably supported via bearings (not shown) by support brackets 211 and 212 situated on the base 210 close to the rail support 255, and serves to move the movable stage 252 in the longitudinal directions with the aid of the drive bracket 252g.

The second motor 257 serves to rotate the ball screw 256 which is adapted to move the movable stage 252 longitudinally. The second motor 257 is attached to a bracket 213 situated on the base 210 close to the support bracket 212, and its rotary shaft 257a is coupled to one end of the ball screw 256 by means of a coupling ring 259.

The second controller 260 is electrically connected to the second coupler/decoupler 240 and the second conveyor 250 by wires, not shown, for controlling the movement, connection and disconnection of the master connector 232, described above. The second controller 260 comprises, for example, a computer including an ECU which is electrically connected to the first and second motors 253 and 257, the connection sensor 241c, and the upper- and lower-limit sensors 249a and 249b through a connection wire 261 extending from the base 210. In the second controller 260 are previously programmed and stored the order of connection/disconnection of the master connector 232 to/from the multiple-fiber connectors 221 arranged on the connector holder 220, operation procedures of the second coupler/decoupler 240 and the second conveyor 250 associated with the connection/disconnection of the master connector 232, etc. The second controller 260 may of course be securely arranged on the base 210.

In this embodiment, an operating panel 260a of the second controller 260 serves as the selector. Alternatively, a selector having selection switches may be arranged on the base 210, or a suitable selector may be separately connected to the ECU.

The n×m optical switch 20 constructed in this manner is used as follows:

First, the n×m optical switch 20 is powered, and the operating panel 260a of the second controller 260 is operated to select the multiple-fiber connectors 221 to which the master connector 232 is to be connected.

The controller 260 sequentially reads out addresses of the multiple-fiber connectors 221 to be connected to the master connector 232, based on the execution of programs stored previously. Then, the controller 260 actuates the second conveyor 250 and the second coupler/decoupler 240 in accordance with the read-out address signals.

Let it be assumed that the second controller 260 reads an address signal representing the address "j-k". In this case, the controller 260 first delivers a drive signal corresponding to address "j" as a longitudinal (Y—Y direction) address, to the second motor 257 of the second conveyor 250 to actuate the same. As the second motor 257 is actuated, the ball screw 256 is rotated so that the movable stage 252 is moved above the connector holder 220 to a position corresponding to the longitudinal address "j".

When the movable stage 252 is stopped, the second controller 260 delivers a drive signal corresponding to the lateral address "k" to the first motor 253, whereby the motor 253 is actuated. As the first motor 253 is actuated, the ball screw 252d is rotated so that the movable table 251 moves in the lateral direction (X—X direction) to a position corresponding to the address "k". The table 251 is stopped at a position above the multiple-fiber connector 221 which is situated at the address "j-k". The positioning precision of the first conveyor 250 is set to such a degree that the alignment pins 232d, projecting from the master connector 232 and tapered at their distal ends, can be received in the corresponding holes 221d bored in each of the multiple-fiber connectors 221.

The second controller 260 then drives the motor 244 of the second coupler/decoupler 240. As the motor 244 is driven, the rotary arm 245a is rotated by the rotary shaft 244a. As a result, the link arm 245b lowers from the position illustrated in FIG. 20, whereby the lifter member 243 starts lowering.

As the lifter member 243 lowers, the retainer 242 retaining the master connector 232 lowers. At this time, the alignment pins 232d of the master connector 232 enter the corresponding holes 221d of the multiple-fiber connector 221, thus guiding the master connector 232 in a proper position relative to the multiple-fiber connector 221. When the axes of the alignment pins 232d do not coincide with the respective axes of the holes 221d, the retainer 242 is raised relative to the other descending elements, to produce a gap between the position adjuster 242b and the groove 243b of the lifter member 243. The retainer 242 is allowed, by this gap, to turn slightly to adjust the position of the master connector 232. In this manner, the position adjustment between the holes 221d and the alignment pins 232d is effected and smooth connection of the master connector 232 and the multiple-fiber connector 221 is ensured.

When the connection end face 232c of the master connector 232 contacts the connection end face 221c of the multiple-fiber connector 221, the retainer 242 stops descending, with the result that the position adjuster 242b is abutted against the plunger 243d of the lifter member 243. Consequently, the master connector 232 is subjected to a constant urging force of about 1 kg·f applied by the spring 243e through the plunger 243d and the retainer 242.

After the master connector 232 is connected to the multiple-fiber connector 221 situated at the address "j-k," a command signal is delivered to the OTDR 6, for example, to cause the same to emit monitoring light with wavelength λ2. The monitoring light is incident to that optical fiber (not shown) in the optical communication lines 1 which is connected to the multiple-fiber connector 221 at the address "j-k," and the faint reflection light, if any, is monitored.

After completion of such monitoring operation, the second controller 260 delivers a drive signal tpull up the retainer 242 of the second coupler/decoupler 240 and disconnect the master connector 232 from the multiple-fiber connector 221. Then, the above-mentioned operation is repeated in accordance with subsequent address signals, so that the master connector 232 is connected sequentially to the multiple-fiber connectors 221 to thereby switch the optical transmission lines.

Although the foregoing embodiment uses a 10-fiber ribbon as the multiple-fiber cable held by the multiple-fiber connector 221 or the master connector 232, a multiple-fiber cable of any other type may alternatively be used. Furthermore, not all the multiple-fiber connectors 221 need be connected to the n-fiber ribbons 270; some of the connectors 221 may be connected to fiber ribbons which include several dummy fibers. Still further, the second conveyor 250 may be constructed to move the movable table 251 and the movable stage 252 at the same time. The address signals, furthermore, output from the second controller 260, may be produced individually from the operating panel 260a through key operations. Moreover, the multiple-fiber connectors 221 on the connector holder 220 may be arranged in a line, instead of being situated in a matrix.

What is claimed is:

1. An optical switch system comprising:
   first optical switch means for optically connecting one end face of a single first optical fiber selectively to one end face of any one of n second optical fibers; and
   second optical switch means for optically connecting end faces of n third optical fibers collectively and substantially synchronously to end faces of fourth optical fibers of a desired bundle selected from a plurality of optical fiber bundles each composed of substantially n optical fibers, said third optical fibers being optically connected at other end faces to other end faces of said second optical fibers.

2. The optical switch system according to claim 1, wherein said first optical switch means comprises n adapter means individually connected to the ends of said second optical fibers, and ferrule means connected to the end of said first optical fiber and having an end face at which said end face of said first optical fiber is exposed, said ferrule means being connectible to any one of said adapter means and, when connected to one of said adapter means, optically connecting the end face of said first optical fiber to the end face of the corresponding second optical fiber to which said ferrule means is being connected by means of the adapter means.

3. The optical switch system according to claim 2, wherein said first optical switch means further comprises first selector means for producing a selection signal to connect said ferrule means to a desired one of said n adapter means, first conveyor means for moving said ferrule means to any one of said adapter means, first coupler/decoupler means for connecting and disconnecting said ferrule to and from said adapter means, and first controller means for causing said first conveyor means to move said ferrule means to a selected one of said adapter means and causing said first coupler/decoupler means to connect and then disconnect said ferrule means to and from the selected one of said adapter means, in accordance with the selection signal from said first selector means.

4. The optical switch system according to claim 2, wherein said first optical switch means further comprises housing means to which said adapter means are attached, and dummy adapter means attached to said housing means, the end face of said dummy adapter means being projected outside of said housing means when said ferrule means is coupled thereto.

5. The optical switch system according to claim 3, wherein said first conveyor means includes a base, a first ball screw rotatably supported by said base, transport table means fitted on said first ball screw and movable in an axial direction of said first ball screw with rotation of the same, and first drive means for rotating said first ball screw.

6. The optical switch system according to claim 5, wherein said first coupler/decoupler means includes second drive means held by said transport table means and having a rotary shaft, cam means attached the rotary shaft of said second drive means, slide table means positioned above said transport table means and carrying said ferrule means, said slide table means being slidable above said transport table means toward said adapter means, and connecting arm means coupled at one end to said cam means eccentrically with the rotary shaft of said second drive means and coupled at other end to said slide table means, said connecting arm means causing said slide table means to reciprocate above said transport table means when actuated by rotation of said rotary shaft.

7. The optical switch system according to claim 3, wherein said first controller means includes sensor means for detecting a position of the adapter means to which said ferrule means is to be moved, said first controller means causing said ferrule means to move to the position of the adapter means detected by said sensor means.

8. The optical switch system according to claim 1, wherein said second switch means comprises first multiple-fiber connector means connected to the end of each of said n third optical fibers and having an end face at which the end faces of said third optical fibers are exposed, and second multiple-fiber connector means equal in number to said optical fiber bundles, connected individually to the ends of said optical fiber bundles each composed of said fourth optical fibers, and having an end face at which the end face of the corresponding optical fiber bundle is exposed, said first multiple-fiber connector means being connected to one of said second multiple-fiber connector means at end faces thereof, thereby optically connecting said third optical fibers collectively and substantially synchronously to said fourth optical fibers through the second multiple-fiber connector means which is being connected to said first multiple-fiber connector means.

9. The optical switch system according to claim 1, wherein said third optical fibers comprise a fiber ribbon having n optical fibers.

10. The optical switch system according to claim 1, wherein said optical fiber bundles including said fourth optical fibers each comprise a fiber ribbon having n optical fibers.

11. The optical switch system according to claim 1, which further includes multiple-fiber connector means for optically connecting each of said third optical fibers to a corresponding one of said second optical fibers.

12. The optical switch system according to claim 8, wherein said first multiple-fiber connector means includes an alignment pin projecting from the end face thereof and having a tapered distal end to be fitted in a hole bored in the end face of said second multiple-fiber connector means, said alignment pin serving to guide the end face of said first multiple-fiber connector means to a predetermined position relative to the end face of said second multiple-fiber connector means.

13. The optical switch system according to claim 8, wherein said second optical switch means includes holder means on which said second multiple-fiber connector means are secured and arranged in respective predetermined positions, second conveyor means holding said first multiple-fiber connector means, for moving the same among said second multiple-fiber connector means on said holder means, second coupler/decoupler means for connecting the end face of said first multiple-fiber connector means to the end face of any one of said second multiple-fiber connector means at a predetermined position, second selector means for producing a selection signal selecting one of said second multiple-fiber connector means, and second controller means for causing said second conveyor means to move said first multiple-fiber connector means to a selected one of said second multiple-fiber connector means and causing said second coupler/decoupler means to connect and then disconnect the end face of said first multiple-fiber connector means to and from the end face of the selected second multiple-fiber connector means, in accordance with the selection signal from said second selector means.

14. The optical switch system according to claim 13, wherein said holder means securely holds said second multiple-fiber connector means disposed in a matrix.

15. The optical switch system according to claim 13, wherein said second conveyor means includes a base, a second ball screw rotatably supported by said base, a movable stage fitted on said second ball screw and movable in an axial direction of said second ball screw with rotation of the same, a movable table positioned above said movable stage and movable in a direction perpendicular to the axial direction of said second ball screw, third drive means for moving said movable table above said movable stage, and fourth drive means for rotating said second ball screw.

16. The optical switch system according to claim 15, wherein said second coupler/decoupler means includes lifter means attached to said movable table of said second conveyor means and movable vertically, fifth drive means for vertically moving said lifter means, and retainer means hanging from said lifter means and holding said first multiple-fiber connector means.

17. The optical switch system according to claim 16, wherein second coupler/decoupler means includes position adjuster means for adjusting the position of connection of said first multiple-fiber connector means and said second multiple-fiber connector means, said position adjuster means hanging said retainer means such that said retainer means is movable only upward relative to said lifter means and is allowed to swing when moved upward.

18. The optical switch system according to claim 17, wherein said second coupler/decoupler means includes spring means urging said position adjuster means downward with a predetermined urging force.

19. A group of the optical switch systems according to claim 1, which comprises third optical switch means for optically connecting one end face of a single fifth optical fiber selectively to one end face of any one of a plurality of sixth optical fibers, said sixth optical fibers being individually optically connected to the first optical fibers of said group of optical switch systems.

* * * * *